United States Patent Office 2,824,897
Patented Feb. 25, 1958

2,824,897
PERCHLOROFLUORO ALCOHOLS

Donald W. Wujciak, Union, Robert H. Wade, West Paterson, and William S. Barnhart, Cranford, N. J., assignors, by mesne assignments, to Minnesota Mining and Manufacturing Company, St. Paul, Minn., a corporation of Delaware No Drawing. Application June 24, 1955
Serial No. 517,928

15 Claims. (Cl. 260—633)

This invention relates to the preparation of primary, secondary, and tertiary polychlorofluoro alcohols. These alcohols are derived from perchlorofluorocarboxylic acids, preferably having from about 4 to about 20 carbon atoms, or from derivatives of the acids. Suitable derivatives of the acids which may be used as starting materials are the acid halides, acid anhydrides, esters, ketones, and the like. The alcohols may also be derived from perchlorofluoroolefins.

One method for the preparation of the novel polychlorofluoro alcohols of the invention is by reduction of a perchlorofluorocarboxylic acid, or a derivative thereof. Among the acids which may be reduced are those prepared according to the disclosures of copending applications Serial No. 452,706, filed August 27, 1954; Serial No. 452,704, filed August 27, 1954; Serial No. 452,703, filed August 27, 1954, and Serial No. 452,705, filed August 27, 1954. Derivatives of the acids which may be reduced are acid halides, such as those prepared according to the disclosure of copending application Serial No. 499,250, filed April 4, 1955; esters, prepared according to the disclosure of copending application Serial No. 493,554, filed March 10, 1955; and acid anhydrides and ketones, prepared according to the disclosure of application Serial No. 517,927, filed June 24, 1955.

Generally speaking, this method of preparation consists of the dropwise addition of the reactant, in the presence or absence of a solvent, over a period of from about 15 minutes to about 2 hours, to a reducing agent in an open vessel, with agitation. If ether is used as a solvent, the heat of the exothermic reaction causes the mixture to reflux, hence, temperatures above about 35° C. are avoided so that reduction of a halogen atom is prevented. If other solvents are used, the temperature is controlled at temperatures above 35° C., depending upon the particular solvent used.

After the addition is completed, the mixture is stirred for a period of from about 1 to 15 hours. The reaction mixture is then decomposed by the careful addition of water, ethyl acetate, ether saturated with water, or water-dioxane solution, to decompose any excess reducing agent. The mixture is then poured into an ice-dilute mineral acid mixture to decompose the salt product. The organic layers are then separated and the aqueous phase is extracted with a solvent such as ether, ethyl acetate, carbon tetrachloride, and the like. The combined organic layers are then washed with a basic solution, such as a mixture of sodium bicarbonate and sodium chloride, until the washings are neutral. The solution is then dried, the ether is evaporated and the product is distilled, if a liquid, or recrystallized, if a solid.

Caution must be observed when using certain reducing agents, such as sodium-alcohol and lithium aluminum hydride. It is essential that the alcohol, preferably ethanol in the case of sodium-alcohol, be perfectly dry in order to avoid hydrolysis. When the lithium compound is used, the reactor must be dried and flushed with nitrogen before the inorganic compound is added, and the entire reaction and decomposition are conducted in an atmosphere of nitrogen.

Perchlorofluoroaldehydes, which may be most conveniently prepared by reacting perchlorofluoronitriles, prepared according to the disclosure of copending application Serial No. 509,408, filed May 18, 1955, now Patent No. 2,788,362 with reducing agents such as lithium aluminum hydride and sodium borohydride, may be, in turn, reduced with mixtures of aluminum alkoxides and alcohols. In this method, the perchlorofluoroaldehyde, aluminum alkoxide, such as aluminum isopropoxide, aluminum t-butoxide, or the like, and an alcohol are mixed in a reactor. The mixture is heated at a temperature between about 50 and 150° C. to drive off the carbonyl compound formed, which corresponds to the alcohol used. A sufficient reaction time is generally about 24 hours; however, if a large excess of aluminum alkoxide is used, the reaction occurs almost immediately and is completed within about one hour. The solvent and by-products are then removed by distillation and the residue is hydrolyzed with a dilute base or a mineral acid. The crude product is then extracted with a low-boiling organic solvent, dried, concentrated, and redistilled, if the product is a liquid, or recrystallized, if the product is a solid.

Another method for the preparation of the alcohols of the invention is by the reduction of esters of perchlorofluorocarboxylic acids, such as those disclosed in copending application Serial No. 493,554, filed March 10, 1955, in which a mixture of sodium and alcohol is used as the reducing agent. A large excess of alcohol and sodium is used in this reaction and the mixed reactants are first cooled in an ice bath until the reaction has subsided, after which the mixture is allowed to warm to room temperature. The reaction mixture is subsequently heated on a steam bath until all of the sodium has reacted. The resulting product is diluted with water, the solvent is distilled, and the crude product is separated by extraction. The extract is washed with water, dried, and distilled or recrystallized.

The reduction of ketone and ester derivatives of perchlorofluorocarboxylic acids, as well as the reduction of perchlorofluorocarboxylic acid halides, anhydrides and aldehyde derivatives, may also be effected in a bomb or autoclave under pressure and, in the case of acid halides, this method is preferred. In Table II below are summarized the operating conditions and catalysts used for each class of compound. All of these catalytic reductions are effected in the presence of hydrogen under pressure, the general procedure being as follows:

To the catalyst and prechlorofluoro or polychlorofluoro acid derivative in an autoclave is added, without agitation, cold hydrogen under pressure. The acid derivative may be reacted in the absence or presence of a solvent; after the addition is completed, the mixture is shaken and heated. Agitation is continued by rocking the autoclave during the reaction period until the calculated quantity of hydrogen is taken up, after which the autoclave is cooled and the hydrogen is vented off. The reaction mixture is then filtered from the catalyst and, if a solvent has been used, it is evaporated off. The crude product is distilled, if a liquid, or recrystallized, if a solid.

Perchlorofluoro or polychlorofluoro compounds which may be reduced in accordance with this invention, the reducing agents or catalysts which may be used, and the conditions of the reduction reactions, are given in Tables I and II below:

TABLE I

*Reduction of polychlorofluoro compounds at atmospheric pressure*

| Perchlorofluoro or polychlorofluoro compounds | Reducing agents | Molar ratio of acid or acid deriv. to reducing agent | Reaction temp. (° C.) | Reaction time | Solvents |
|---|---|---|---|---|---|
| Acid halide | Lithium aluminum hydride [1] sodium borohydride, sodium amalgam. | 2:1 to 1:20; 2:1 to 1:10.[1] | −20 to 150; 0 to 80.[1] | Immediate to 48 hours; immediate to 24 hours.[1] | Ethyl ether, tetrahydrofuran, dioxane, dibutyl ether, water, etc. |
| Acid anhydride. | Lithium aluminum hydride; sodium borohydride, sodium amalgam, sodium+alcohol (pref. ethanol). | 2:1 to 1:10; 2:1 to 1:5.[1] | −20 to 150; 0 to 80.[1] | Immediate to 48 hours; immediate to 24 hours.[1] | Methanol, ethanol, ethyl ether, tetrahydrofuran, dioxane, water, etc. |
| Esters | Lithium aluminum hydride, sodium borohydride, sodium amalgem, sodium+alcohol (ethanol).[1] | 2:1 to 1:20; 2:1 to 1:12.[1] | −20 to 150; 0 to 80.[1] | 2 to 56 hrs.; 5 to 24 hrs.[1] | Ethyl ether, tetrahydrofuran, dioxane, dibutyl ether, water, etc. |
| Acids | Lithium aluminum hydride,[1] sodium borohydride. | 2:1 to 1:30; 1:1 to 1:15.[1] | 0 to 150; 30 to 100.[1] | 2 to 100 hrs.; 5 to 50 hrs.[1] | Ethyl ether, tetrahydrofuran. |
| Ketones | Aluminum alkoxides+alcohol (isopropanol,[1] ethanol, or any alcohol, except t-alcs.), sodium amalgam, zinc dust, acetic acid. | 3:1 to 1:10; 1:1 to 1:5.[1] | 0 to 200; 30 to 150.[1] | Immediate to 72 hours; immediate to 24 hours.[1] | Methanol, ethanol, isopropanol, butanol, acetic acid, water, etc. |
| Aldehydes | Lithium aluminum hydride, sodium borohydride, sodium amalgam, aluminum alkoxide +alcohol (isopropanol,[1] ethanol, or any alcohol, except t-alcs.) sodium+alcohol (ethanol). | 2:1 to 1:10; 2:1 to 1:5.[1] | 30 to 200; 50 to 150.[1] | Immediate to 48 hours; immediate to 24 hours.[1] | Methanol, ethanol, ethyl ether, cyclohexane, water, etc. |

[1] Preferred.

TABLE II

*Catalytic reduction of perchlorofluoro compounds with $H_2$ under pressure*

| Perchlorofluoro compound | Catalyst | Pressure (p. s. i. g.) | Time, hrs. | Temp., ° C. | Molar ratio of perchlorofluoro compound to hydrogen | Solvents (rarely used) |
|---|---|---|---|---|---|---|
| Acid halides | Copper chromite [1] Raney nickel platinum palladium. | 750 to 6,000; 1,500 to 4,500.[1] | Immediate to 168; immediate to 24.[1] | 30 to 300; 70 to 175.[1] | 1:1 to 1:300; 1:25 to 1:200.[1] | Butyl ether dioxane alcohols sat'd hydrocarbon hexane cyclohexane. |
| Acid anhydrides | do | 750 to 6,000; 1,000 to 3,000.[1] | Immediate to 168; immediate to 24.[1] | 30 to 300; 70 to 175.[1] | 1:1 to 1:100; 1:1 to 1:25.[1] | Do. |
| Acid aldehydes | do | 5 to 500; 5 to 100 [1] | Immediate to 24; immediate to 12.[1] | 30 to 150; 30 to 100.[1] | 1:1 to 1:50; 1:1 to 1:15.[1] | Do. |
| Esters | do | 750 to 6,000; 1,000 to 3,000.[1] | Immediate to 96; immediate to 24.[1] | 30 to 300; 40 to 150.[1] | 1:1 to 1:200; 1:1 to 1:50.[1] | Do. |
| Ketones | do | 100 to 1,000; 250 to 750.[1] | Immediate to 24; immediate to 16.[1] | 30 to 200; 30 to 150.[1] | 1:1 to 1:200; 1:1 to 1:25.[1] | Do. |

[1] Preferred.

The ketone and ester derivatives of perchlorofluorocarboxylic acids, as well as perchlorofluorocarboxylic acid halides and anhydrides, may also be reacted with Grignard reagents to produce tertiary alcohols. Reaction of perchlorofluoroaldehydes with Grignard reagents produces secondary alcohols. Suitable Grignard reagents are those having the formula:

in which R is, for example, a methyl, ethyl, propyl, allyl, crotyl, cyclopropyl, cyclobutyl, phenyl or benzyl radical and X is halogen.

Generally speaking, in this method of preparation the acid derivative is added to a freshly prepared solution of a Grignard reagent. If a solvent is used with the acid derivative, the solvent may be evaporated from the Grignard reagent unless it is the same solvent used for the acid derivative. It is sometimes desirable to use a higher boiling solvent to support higher reaction temperatures used in the subsequent reaction. The mixture is agitated and allowed to reflux, if a low-boiling solvent is used, and if a high-boiling solvent is employed, refluxing is not essential. The Grignard products obtained, having the formula

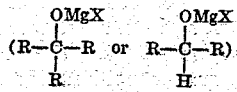

are decomposed with about 25 percent sulfuric acid or by pouring the reaction mixture onto ice and dilute mineral acid. In the event the reaction product is sensitive to the dehydrating action of mineral acids, it is best to effect hydrolysis with saturated ammonium chloride solution. The solvent is then removed and the product is distilled or recrystallized.

Generally speaking, the acid derivatives are reacted in the presence or absence of a solvent, such as ethyl ether, tetrahydrofuran, butyl ether, benzene, toluene, xylene, and the like. It is essential that the Grignard reagent be dissolved in a solvent of this type. The molar ratio of acid derivative to solvent (if one is used) is between about 1:2 and about 1:10 while the molar ratio of Grignard reagent to solvent is between about 1:2 and about 1:50, preferably between about 1:5 and about 1:20. The temperature used in this reaction may be between about 0 to 145° C., or as high as the reflux temperature of the solvent, e. g., 142.4° C. is the boiling point of dibutyl ether. The temperature is preferably in the range of about 30° C. to the reflux temperature of the solvent used. The product begins to form immediately and the reaction may be extended over a period of 24 hours, although it is usually complete within about 5 hours. The molar ratio of acid derivative to Grignard reagent used in this reaction varies between about 1:1 and about 1:10, and is preferably between about 1:1 and about 1:4.

The novel polychlorofluoro alcohols of the invention may also be prepared by free radical catalysis from a terminally unsaturated perchlorofluoroolefin, prepared according to the disclosure of copending application, Serial No. 517,926, filed June 24, 1955, by the addition of an alcohol thereto. This method consists of reacting an alcohol having from 1 to 3 carbon atoms with a terminally unsaturated perchlorofluoroolefin in a molar ratio of alcohol to olefin between about 1:1 and about 10:1, preferably between about 2:1 and about 6:1, in the presence of a catalyst.

Suitable catalysts for this reaction include peroxide catalysts such as benzoyl peroxide, acetyl peroxide, t-butyl hydroperoxide, t-butyl perbenzoate, and the like, and of these, benzoyl peroxide is preferred. The catalyst is used in an amount varying between about 0.5 and about 1.0 percent by weight of the reactants. The reaction temperature may be between about 80 and about 200° C., preferably between about 100 and 130° C., and the reaction time may be between about 1 and about 48 hours, preferably from about 2 to about 16 hours.

The novel polychlorofluoro alcohols prepared by the method of this invention are useful as solvents, surfactants, disinfectants, fungicides, chemical intermediates in the preparation of other highly halogenated derivatives and as primers for polychlorotrifluoroethylene plastic coatings.

The preferred polychlorofluoro primary mono alcohols of this invention have the formula,

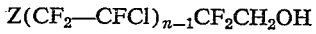
$Z(CF_2-CFCl)_{n-1}CF_2CH_2OH$ in which Z is chlorine, or a perhalomethyl radical having a total atomic weight not in excess of 146.5, and $n$ is an integer from 2 to 10.

The preferred polychlorofluoro secondary mono alcohols of this invention have the formula,

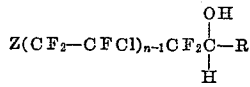
$$Z(CF_2-CFCl)_{n-1}CF_2\underset{H}{\overset{OH}{C}}-R$$

in which Z and $n$ are as given above and R is an alkyl, aryl, alkenyl, cycloalkyl, cycloalkenyl or heterocyclic radical having not in excess of about 20 carbon atoms.

The preferred polychlorofluoro tertiary mono alcohols of this invention are those having the formula,

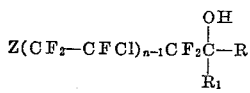
$$Z(CF_2-CFCl)_{n-1}CF_2\underset{R_1}{\overset{OH}{C}}-R$$

in which Z and $n$ are as given above and R and $R_1$ are alkyl, aryl, alkenyl, cycloalkyl, cycloalkenyl or heterocyclic radicals having not in excess of about 20 carbon atoms.

Exemplary of the unsubstituted alkyl radicals which may be used in the above formulas are methyl, ethyl, propyl, butyl, and the like and isomers thereof, while substituted aryl radicals may be 2-ethoxyethyl, 2-methoxyethyl, and the like and isomers thereof; unsubstituted aryl radicals may be phenyl, xylyl, ethylphenyl, cymyl, duryl, cumyl, naphthyl, methylnaphthyl, benzyl, and the like and isomers thereof, while substituted aryl radicals may be anisyl, dimethoxyphenylene, chlorophenyl, chloroxylyl, dichlorophenylene, chloroanisyl, chloronaphthyl, dimethylaminophenyl, vinylphenyl, cresyl, hydroxyphenyl, aminophenyl, and the like and isomers thereof; unsubstituted alkenyl radicals may be allyl, butenyl, pentenyl, and the like and isomers thereof, while substituted alkenyl radicals may be 2-ethoxyallyl and the like; unsubstituted cycloalkyl radicals may be cyclohexyl, cyclopentyl, cyclobutyl, bornyl, methylcyclohexyl, camphanyl, and the like and isomers thereof, while substituted cycloalkyl radicals may be methoxycyclohexyl, dimethylaminocyclohexyl, and the like and isomers thereof; unsubstituted cycloalkenyl radicals may be cyclohexenyl, cyclopentenyl, methylcyclohexenyl, and the like and isomers thereof, while substituted cycloalkenyl radicals may be methoxycyclohexenyl, and the like and isomers thereof; and unsubstituted heterocyclic radicals may be pyranyl, furyl, pyrryl, thienyl, pyridyl, pyrazinyl, and the like and isomers thereof, while substituted heterocyclic radicals may be chlorofuryl, chloropyrryl, chlorothienyl, dichloropyrryl, methoxypyridyl, and the like and isomers thereof.

Diols having an even or odd number of carbon atoms may also be prepared according to the invention, the diols having an even number of carbon atoms having the formula,

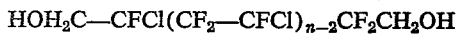
$HOH_2C-CFCl(CF_2-CFCl)_{n-2}CF_2CH_2OH$ in which n is an integer from 2 to 9.

The mono and dialcohols prepared by the addition of alcohols to perchlorofluoroolefins are slightly different in structural configuration, compounds having the formula,

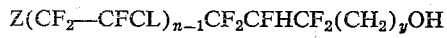
$Z(CF_2-CFCL)_{n-1}CF_2CFHCF_2(CH_2)_yOH$ in which Z is as given above, $n$ is an integer from 2 to 9, and $y$ is an integer from 1 to 3, being exemplary of the mono alcohols produced by this method; and compounds having the formula,

$HO(H_2C)_yCF_2CFH(CF_2-CFCl)_nCF_2CFHCF_2(CH_2)_yOH$ in which $n$ is an integer from 1 to 7, and $y$ is an integer from 1 to 3, being exemplary of the diols produced by this method.

The invention will be further illustrated by reference to the following specific examples:

EXAMPLE 1

*Preparation of* $Cl(CF_2CFCl)_3CF_2CH_2OH$.—In a 2 liter 3-necked flask fitted with a nitrogen inlet, stirrer, condenser and dropping funnel were placed 420 ml. of ether containing about 0.4 mole of $LiAlH_4$. Then a solution of 100 grams (0.2 mole) of $Cl(CF_2CFCl)_3CF_2COCl$ in 150 ml. of ether was added gradually over a 2 hour period with stirring (under nitrogen). The ether refluxed, due to the heat of reaction. After stirring the mixture (ether and $LiAlH_4$ complex) for an additional hour, the excess reagent and the complex were decomposed by the careful addition of 60 ml. of water with vigorous stirring. The mixture was poured into 1.3 liters of 10 percent $H_2SO_4$ to dissolve the insoluble hydroxides. The ether layer was separated, the aqueous layer was saturated with anhydrous $Na_2SO_4$ (300 grams), and extracted three times with ether. The combined ether layers were washed with a saturated NaCl solution, 5 percent $NaHCO_3$ solution, again with a saturated NaCl solution and were finally treated with anhydrous calcium sulfate. The ether was evaporated and the liquid residue distilled through a 6 inch Vigreux column. The following fractions were collected:

| No. | Gms. | B. P. (14 mm), ° C. | $d_4^{20}$ | $n_D^{20}$ | $MR_D$[1] | Cl anal. Calc'd. | Cl anal. Found |
|---|---|---|---|---|---|---|---|
| 1 | 2.4 | 117–118 | 1.719 | 1.3650 | 60.5 | 30.4 | 11.9 |
| 2 | 10.2 | 118–122 | 1.741 | 1.3659 | 59.9 | | |
| 3 | 14.3 | 122–138 | 1.802 | 1.3333 | | | |
| 4 | 21.8 | 138–141 | 1.847 | 1.3961 | 60.6 | | |
| 5 | 18.4 | 141–141.5 | 1.863 | 1.3982 | 60.4 | 30.4 | 30.2 |
| 6 | 9.9 | 141.5 | 1.862 | 1.4003 | 60.7 | | |
| 7 | 2.2 | 141.5 | 1.855 | 1.4004 | 60.9 | | |
| 8 | 2.0 | Residue | | | | | |

[1] Calculated 60.79.

It was believed that fractions 1 and 2 were the aldehyde, but spectral analysis revealed strong alcohol and weak carbonyl absorption. Fraction 5 showed only a strong alcohol absorption. Dehalogenation obviously occurred in fraction 1.

EXAMPLE 2

*Preparation of*

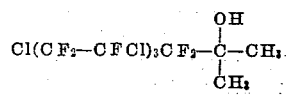
$$Cl(CF_2-CFCl)_3CF_2-\underset{CH_3}{\overset{OH}{C}}-CH_3$$

A solution of methyl magnesium iodide (0.92 mole)

was prepared in ether by the reaction of magnesium and methyl iodide. An ether solution of

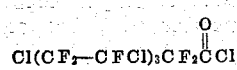

(0.45 mole) was added under an atmosphere of nitrogen at a rate sufficient to maintain a moderate reflux. After standing overnight, the solution was decomposed with saturated $NH_4Cl$ and the precipitated solid was extracted several times with ether. The combined organic solution was concentrated and distilled through a ¾ inch x 30 inch packed column. Pressure = 10 mm.

| Fraction | Identity | Moles | $n_D^{20}$ | $d_4^{20}$ | M. R. Calc. | M. R. Found | Percent Yield |
|---|---|---|---|---|---|---|---|
| 1. 108–123° | (a) | 0.034 | 1.4014 | 1.675 | 68.1 | 69.2 | 7.6 |
| 2. 145–146° | (b) | 0.26 | 1.4083 | 1.758 | 70.1 | 69.5 | 57.9 |
| | | | | | | | 65.5 |

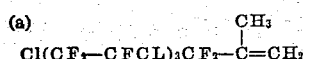

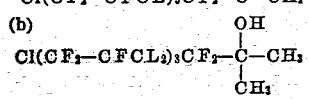

The main fraction was shown by infra-red analysis to contain hydroxyl groups but no carbonyl band.

EXAMPLE 3

*Addition of methanol to 4,6,7-trichlorooctafluoro heptene-1.*—A mixture of 2 moles of methanol and 1.5 grams of benzoyl peroxide is charged to an autoclave. The autoclave is cooled with liquid air, evacuated and 0.4 mole of 4,6,7-trichlorooctafluoroheptene-1 is introduced. The autoclave is then closed and the contents agitated at 100–130° C. for 5 hours. The unreacted olefin is bled from the autoclave at room temperature and undecomposed peroxide is destroyed by the addition of ferrous sulfate or sodium bisulfite to the reaction mixture. Fractionation of the reaction mixture gives about a 75 percent yield of $Cl(CF_2—CFCl)_2CF_2CFHCF_2CH_2OH$.

EXAMPLE 4

*Preparation of*

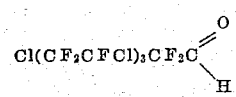

To 1 mole of $Cl(CF_2CFCl)_3CF_2CN$ is added 0.25 mole of $LiAlH_4$ in 500 ml. of ether with stirring, and cooling to temperatures as low as −70° C. After the addition is completed, the mixture is carefully allowed to warm to room temperature. The mixture is then decomposed with cold dilute HCl and the product is extracted with ether, washed and dried. 3,5,7,8 - tetrachloroundecafluorocaproaldehyde is obtained in about 55 percent yield.

EXAMPLE 5

*Preparation of* $Cl(CF_2CFCl)_3CF_2CF_2OH$.—To a solution of 0.62 mole $LiAlH_4$ in 1 liter of ether, is added with stirring, 0.5 mole of $Cl(CF_2CFCl)_3CF_2COOH$ in 1 liter of ether. During the addition the mixture is allowed to reflux. After the addition is completed, the mixture is refluxed for at least 6 hours and then cooled. Water (100 ml.) followed by a cold solution of dilute $H_2SO_4$ (1 liter) is added to the mixture. The ether layer is separated, washed with dilute acid, aqueous sodium bicarbonate and then with water. The solution is then dried and concentrated. The product is distilled to obtain a yield of about 50 percent of 3,5,7,8-tetrachloro-1,1-dihydroundecafluorooctanol.

EXAMPLE 6

*Preparation of* $HOH_2C(CF_2CFCl)_3CH_2OH$.—In a 3-necked flask fitted with a nitrogen inlet, stirrer, condenser and dropping funnel is placed 800 ml. of ether containing about 0.8 mole of $LiAlH_4$. A solution of 0.2 mole of $ClCO(CF_2CFCl)_3COCl$ in 150 ml. of ether is added gradually to the flask with stirring (under nitrogen). The mixture refluxes and after an hour the excess reagent and the $LiAlH_4$ complex are decomposed by the careful addition of water (100 ml.) with vigorous stirring. The mixture is then poured into 2.5 liters of 10 percent $H_2SO_4$ to dissolve insoluble hydroxides. The ether layer is separated; the aqueous layer is saturated with anhydrous $Na_2SO_4$ and extracted several times with ether. The combined ether layers are washed with a saturated solution of NaCl, with 5 percent $NaHCO_3$ and again with saturated NaCl and are finally dried over anhydrous calcium sulfate. The ether is evaporated and the liquid is distilled to obtain a yield of about 50 percent of 3,5,7 - trichloro - 1,1,8,8 - tetrahydrononafluoro octa-1,8-diol.

EXAMPLE 7.—PREPARATION OF AN ALCOHOL FROM A KETONE AND A GRIGNARD REAGENT WHEREIN R IS AN AROMATIC GROUP

*Preparation of*

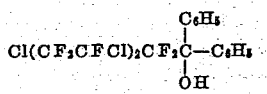

A solution of phenyl magnesium bromide (1.2 moles) is prepared in ether by the reaction of magnesium with phenyl bromide. An ether solution of

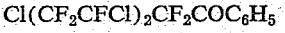

(0.4 mole) is added under an atmosphere of nitrogen at a rate sufficient to maintain moderate reflux. After standing 16 hours, the solution is hydrolyzed with saturated $NH_4Cl$ and the precipitated solid is extracted several times with ether. The combined organic solution is concentrated and distilled to obtain a yield of about 50 percent of the desired product.

EXAMPLE 8.—PREPARATION OF AN ALCOHOL FROM ALDEHYDE AND GRIGNARD REAGENT WHEREIN R IS A CYCLOALKENE GROUP

*Preparation of*

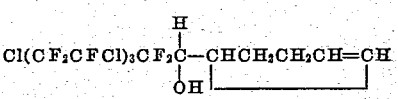

A solution of cyclopentene magnesium chloride (0.4 mole) is prepared in ether by the reaction between magnesium and 3-chlorocyclopentene. An ether solution of

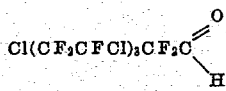

(0.3 mole) is added under an atmosphere of nitrogen at a rate sufficient to maintain a moderate reflux. After standing 10 hours, the solution is hydrolyzed with saturated $NH_4Cl$ and the precipitated solid is extracted several times with ether. The combined organic solution is concentrated and distilled to obtain a yield of about 60 percent of the desired product.

EXAMPLE 9.—PREPARATION OF AN ALCOHOL FROM ALDEHYDE AND GRIGNARD REAGENT WHEREIN R IS A HETEROCYCLIC RADICAL

*Preparation of*

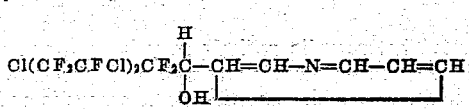

A solution of pyridine-β-magnesium bromide (0.6 mole) is prepared in ether by the reaction between magnesium and β-bromopyridine. An ether solution of

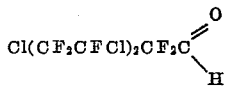

(0.3 mole) is added under an atmosphere of nitrogen at a rate sufficient to maintain reflux. After standing overnight, the solution is hydrolyzed with saturated NH₄Cl and a precipitated solid is extracted several times with ether. The combined organic solution is concentrated and distilled.

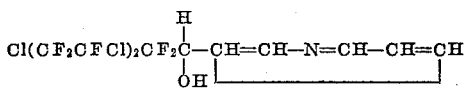

is obtained in about 50 percent yield.

EXAMPLE 10.—PREPARATION OF AN ALCOHOL FROM AN ALDEHYDE AND A GRIGNARD REAGENT WHEREIN R IS A CYCLIC HYDROCARBON GROUP

*Preparation of*

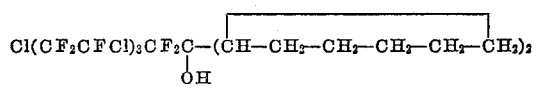

A solution of cyclohexyl magnesium bromide (1.2 moles) is prepared in ether by the reaction between magnesium and bromocyclohexane. An ether solution of $$Cl(CF_2CFCl)_3CF_2\overset{O}{\overset{\|}{C}}-O-\overset{O}{\overset{\|}{C}}-CF_2(CFClCF_2)_3Cl$$

(0.3 mole) is added under an atmosphere of nitrogen at a rate sufficient to maintain reflux. After standing overnight, the solution is hydrolyzed with saturated NH₄Cl and the precipitated solid is extracted several times with benzene. The combined organic solution is concentrated and distilled to obtain a yield of about 60 percent of the desired product.

EXAMPLE 11.—PREPARATION OF AN ALCOHOL FROM AN ESTER AND A GRIGNARD REAGENT WHEREIN R IS AN ALKENE RADICAL

*Preparation of*

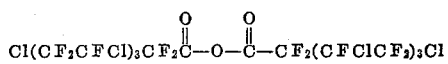

A solution of allylmagnesiumchloride (0.7 mole) is prepared in ether by the reaction between magnesium and allychloride. An ether solution of $$Cl(CF_2CFCl)_4CF_2COOC_2H_5$$

(0.3 mole) is added under an atmosphere of nitrogen at a rate sufficient to maintain a moderate reflux. After standing 12 hours, the solution is hydrolyzed with saturated NH₄Cl and the precipitated solid is extracted several times with toluene. The combined organic solution is concentrated and distilled to obtain a yield of about 50 percent of the desired product.

EXAMPLE 12.—PREPARATION OF AN ALCOHOL FROM THE KETONE DERIVATIVE OF THE C₇ PERCHLOROFLUOROCARBOXYLIC ACID AND A REDUCING AGENT IN A BOMB

*Preparation of*

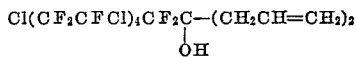

One mole of CCl₃(CF₂CFCl)₂CF₂COCH₃ and 3 grams (0.05 mole) of Raney nickel is introduced into a bomb. Hydrogen is piped in under about 1,000 pounds' pressure. The bomb is rocked and heated to 100° C. until the calculated amount of hydrogen is taken up. The bomb is then cooled and excess hydrogen is vented off. The contents of the bomb are filtered and the bomb is washed out with ethyl alchol. The filtrates are concentrated and fractionated to obtain a yield of about 70 percent of the desired product.

EXAMPLE 13.—PREPARATION OF AN ALCOHOL FROM AN ALDEHYDE USING AN ALUMINUM ALKOXIDE+ALCOHOL REDUCING AGENT

Into a 2 liter 2-necked flask immersed in an oil bath are placed 1 mole of

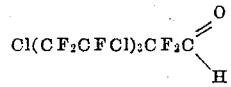

600 ml. of anhydrous isopropyl alcohol and 1 mole of aluminum isopropoxide. A fractionating column and a nitrogen tube are attached to the flask. The oil bath is then heated to 135° C. and a slow current of nitrogen gas is admitted. The mixture is allowed to boil vigorously until no more carbonyl compound (corresponding to the alcohol) is distilled (about 24 hrs.). The temperature of the bath is allowed to fall to 120° C. and the alcohol is distilled. When the residue (the aluminum complex) is nearly dry, the flask is removed from the oil bath and the solid is treated with 250 ml. of 20 percent H₂SO₄ and stirred thoroughly to insure complete decomposition. The mixture is steam distilled and the resulting two layers are separated. The aqueous layer is saturated with sodium sulfate and extracted with ether. This ether solution is added to the main portion of the alcohol which has been distilled and the whole is dried over anhydrous sodium sulfate. The ether is evaporated off and the crude product is distilled to obtain a yield of about 80 percent of

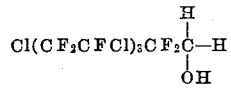

EXAMPLE 14.—PREPARATION OF AN ALCOHOL FROM AN ESTER USING SODIUM+ALCOHOL AS A REDUCING AGENT

A 3-necked round bottom flask is fitted with a stirrer, a reflux condenser and an opening through which are introduced 3 moles of sodium and 200 ml. of dry toluene. The flask is heated in an oil bath until the sodium is melted. The mixture is allowed to cool to 60° C. while stirring constantly. To the mixture is then added 0.5 mole of Cl(CF₂CFCl)₄CF₂COOC₂H₅ in 150 ml. of absolute ethanol. After this addition is complete, 500 additional ml. of ethanol are added rapidly. When the reaction has subsided, the flask is heated on the steam bath until the sodium is dissolved. The mixture is then steam distilled to remove toluene, ethanol, and product. The mixture is then fractionated to remove ethanol. The layers are separated and the water layer is extracted with ether. The organic layers are combined, washed with water, sodium carbonate solution, and again with water and dried over anhydrous magnesium sulfate. The solvents are evaporated and the crude alcohol is distilled under diminished pressure to obtain a yield of about 60 percent of

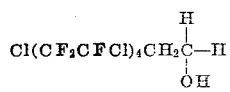

It will be obvious to those skilled in the art that many modifications may be made within the scope of the present invention without departing from the spirit thereof, and the invention includes all such modifications.

We claim:

1. An alcohol having a perfluorochlorocarbon chain having the recurring unit, —CF₂CFCl—, said chain being bonded at one terminus by a radical selected from the group consisting of a chlorine atom, a perhalomethyl radical having an atomic weight not in excess of 146.5, a —CF₂CFHCF₂— divalent radical, a —CF₂CFH— divalent radical, a —CFCl— divalent radical, a —CFHCFCl— divalent radical and a —CF₂— divalent radical, said perfluorochlorocarbon chain being bonded at its other terminus only by one of said divalent radicals, and in which each of said divalent radicals is additionally bonded to a hydroxyl-containing group selected from the group consisting of $$-(CH_2)_y-OH, \quad -\underset{H}{\overset{OH}{\underset{|}{C}}}-R \quad \text{and} \quad -\underset{R_1}{\overset{OH}{\underset{|}{C}}}-R \text{ radicals}$$

wherein $y$ is an integer from 1 to 3, and R and $R_1$ are selected from the group consisting of alkyl, aryl, alkenyl, cycloalkyl, cycloalkenyl and heterocyclic radicals having not in excess of 20 carbon atoms per radical.

2. An alcohol having the formula, $$Z(CF_2-CFCl)_{n-1}CF_2CH_2OH$$

in which Z is selected from the group consisting of chlorine and perhalomethyl radicals having a total atomic weight not in excess of 146.5, and $n$ is an integer from 2 to 10.

3. An alcohol having the formula, $$Cl(CF_2-CFCl)_{n-1}CF_2CH_2OH$$

in which $n$ is an integer from 2 to 10.

4. An alcohol having the formula, $$Z(CF_2-CFCl)_{n-1}CF_2\underset{H}{\overset{OH}{\underset{|}{C}}}-R$$

in which Z is selected from the group consisting of chlorine and perhalomethyl radicals having a total atomic weight not in excess of 146.5, $n$ is an integer from 2 to 10, and R is selected from the group consisting of alkyl, aryl, alkenyl, cycloalkyl, cycloalkenyl and heterocyclic radicals having not in excess of about 20 carbon atoms.

5. An alcohol having the formula, $$Cl(CF_2-CFCl)_{n-1}CF_2\underset{H}{\overset{OH}{\underset{|}{C}}}-R$$

in which $n$ is an integer from 2 to 10, and R is selected from the group consisting of alkyl, aryl, alkenyl, cycloalkyl, cycloalkenyl and heterocyclic radicals having not in excess of about 20 carbon atoms.

6. An alcohol having the formula, $$Z(CF_2-CFCl)_{n-1}CF_2\underset{R_1}{\overset{OH}{\underset{|}{C}}}-R$$

in which Z is selected from the group consisting of chlorine and perhalomethyl radicals having a total atomic weight not in excess of 146.5, $n$ is an integer from 2 to 10, and R and $R_1$ are selected from the group consisting of alkyl, aryl, alkenyl, cycloalkyl, cycloalkenyl, and heterocyclic radicals having not in excess of about 20 carbon atoms.

7. A diol having the formula, $$HOH_2C-CFCl(CF_2-CFCl)_{n-2}CF_2CH_2OH$$

in which $n$ is an integer from 2 to 9.

8. A diol having the formula, $$HOH_2C(CF_2-CFCl)_nCF_2CH_2OH$$

in which $n$ is an integer from 1 to 8.

9. An alcohol having the formula, $$Z(CF_2-CFCl)_{n-1}CF_2CFHCF_2(CH_2)_yOH$$

in which Z is selected from the group consisting of chlorine and perhalomethyl radicals having a total atomic weight not in excess of 146.5, $n$ is an integer from 2 to 9, and $y$ is an integer from 1 to 3.

10. An alcohol having the formula, $$Cl(CF_2-CFCl)_{n-1}CF_2CFHCF_2(CH_2)_yOH$$

in which $n$ is an integer from 2 to 9, and $y$ is an integer from 1 to 3.

11. A diol having the formula, $$HO(H_2C)_yCF_2CFH(CF_2-CFCl)_nCF_2CFHCF_2(CH_2)_yOH$$

in which $n$ is an integer from 1 to 7, and $y$ is an integer from 1 to 3.

12. A diol having the formula, $$HO(H_2C)_yCF_2CFH(CF_2-CFCl)_nCFHCFCl(CH_2)_yOH$$

in which $n$ is an integer from 1 to 8, and $y$ is an integer from 1 to 3.

13. An alcohol having the formula, $$Cl(CF_2CFCl)_3CF_2CH_2OH$$

14. An alcohol having the formula, $$Cl(CF_2-CFCl)_{n-1}CF_2\underset{R_1}{\overset{OH}{\underset{|}{C}}}-R$$

wherein $n$ is an integer from 2 to 10 and R and $R_1$ are alkyl radicals having not in excess of about 20 carbon atoms.

15. An alcohol having the formula, $$Cl(CF_2-CFCl)_3CF_2-\underset{CH_3}{\overset{OH}{\underset{|}{C}}}-CH_3$$

References Cited in the file of this patent
UNITED STATES PATENTS 2,559,628    Joyce            July 10, 1951
2,666,797    Husted et al.       Jan. 19, 1954

UNITED STATES PATENT OFFICE
Certificate of Correction

Patent No. 2,824,897              February 25, 1958

Donald W. Wujciak et al.

It is hereby certified that error appears in the printed specification of the above numbered patent requiring correction and that the said Letters Patent should read as corrected below.

Column 8, lines 71 to 74, and column 9, lines 13 to 16, the formula in each occurrence should appear as shown below instead of as in the patent—

Signed and sealed this 12th day of August 1958.

[SEAL]

Attest:
KARL H. AXLINE,
*Attesting Officer.*

ROBERT C. WATSON,
*Commissioner of Patents.*